July 8, 1947.  B. H. BILLINGS ET AL  2,423,476

BOLOMETER

Filed March 7, 1946

Bruce H. Billings
Walter L. Hyde and
Edgar E. Barr
INVENTORS

BY Donald L. Brown
Attorney

Patented July 8, 1947

2,423,476

UNITED STATES PATENT OFFICE 2,423,476

BOLOMETER

Bruce H. Billings and Walter L. Hyde, Cambridge, and Edgar E. Barr, North Woburn, Mass., assignors to Polaroid Corporation, Cambridge, Mass., a corporation of Delaware Application March 7, 1946, Serial No. 652,524

5 Claims. (Cl. 201—63)

This invention relates to a new and improved bolometer. More specifically, it embraces in its more general aspects a heat detector which operates in the 7 to $14\mu$ region of the electromagnetic spectrum.

Broadly, the term "bolometer" as used herein is intended to indicate a resistive impedance whose temperature and therefore resistance changes when subjected to radiation.

In its broadest aspect, the embodiment herein disclosed comprises a heat detector, the sensitive element of which is an evaporated metallic layer. This layer forms a part of the input impedance circuit of an electronic amplifying system which, in turn, effects the operation of a particular servo-system whereby any one of a number of desired results may be obtained such, for example, as directional control, heat control, temperature measurements, and the like.

It is an object of this invention to obtain a bolometer having an extremely low time constant of operation.

It is a further object hereof to produce a sensitive element for a heat detector having extremely high sensitivity.

Still another object is to obtain a bolometer having a low Johnson noise level as well as having as low noise characteristics with respect to such noises as are caused by current passing through the bolometer, noises due to microphonics, and other undesirable noises such as may be caused by mechanical stimulation, acoustic vibrations, or actual mechanical shock or impact.

Still other and further objects will be pointed out or will readily suggest themselves to those versed in the art upon reading the following description of a particular embodiment of the invention.

In the drawings illustrating a preferred embodiment of the invention:

Figure 1:
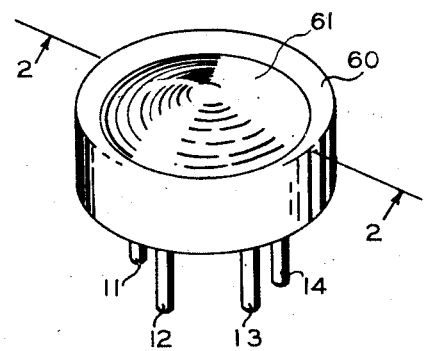
Figure 1 is a perspective view of the completed bolometer.
Figure 2:
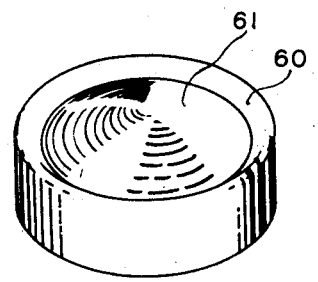
Figure 2 is a vertical section taken on the line 2—2 of Fig. 1.
Figure 2:
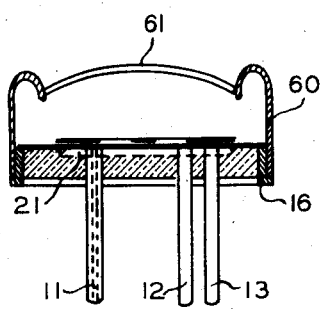
Figure 3:
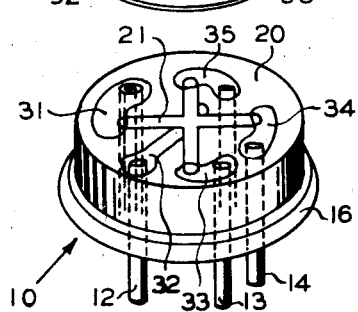
Figure 3 is an exploded view of the bolometer shown in Fig. 1 giving further details of its complete construction.

Referring now more specifically to the drawings, base plate 10 of Fig. 3 comprises five terminal pins or leads 11, 12, 13, 14 and 15, and a metal collar 16, all held together and insulated from each other by fused glass base 20; the characteristics of the soft glass base 20 and the imbedded metals are, of course, carefully matched. Lead 11 is in the form of a hollow tube which is used later to evacuate the assembled unit, Fig. 1.

Base 10, Fig. 3, has a diameter in one particular preferred embodiment of about 13 mm. and a height of about 1 mm.; this base 10 is first ground and polished, after which cross 21 extending 9.5 mm. in length, i. e., somewhat less than the diameter of the ring, and about 1 mm. wide and approximately 0.5 mm. deep, is then sandblasted in the upper glass surface 20. The sandblasting is effected by clamping a steel template (in which a cross of the desired size is milled) on top of the glass base 20 and subjecting the latter to a fine sand or emery blast until the desired depth or cut of cross 21 is obtained.

After cleaning and scouring the sandblasted surface 20, the relatively thick metallic contacts 31, 32, 33, 34 and 35 are deposited by evaporation of preselected metals over the tops of exposed leads 11, 12, 13, 14 and 15, respectively. These metallic contacts extend from the leads to the points where the sensitive cross elements (subsequently deposited as described below) end, contact 32, however, connecting the center of sensitive metal cross element 40 (described below) to lead 12.

These contacts are evaporated through appropriate openings in a superimposed template and result in an extremely strong metal-to-glass bond. Preferably these contacts are made by evaporating chromium at a vacuum of about $10^{-4}$ mm. of mercury, over which a silver layer is subsequently evaporated and further blended in until a relatively opaque layer is obtained.

The nitrocellulose film 50, Fig. 3, is next prepared by allowing a drop of nitrocellulose in solution to spread to a uniform thickness on the surface of water in a container. The film thus formed is lowered onto the upper surface of base 10 by siphoning the water from the container in which base 10 is submerged. Although other materials may be used to form film 50, i. e., nylon, Formvar, etc., it has been found that the following nitrocellulose solution yields highly satisfactory results:

| | | |
|---|---|---|
| Wet 500 sec. nitrocellulose | grams | 20 |
| Ethyl acetate | cubic centimeters | 300 |
| Amyl acetate | do | 75 |
| Acetone | do | 75 |

Although during the step of depositing the nitrocellulose pellicle down over the contacts by this method, cross 21 fills with water, the entrapped water is readily removed by subsequently heating the unit.

The next step in assembling the bolometer comprises evaporating metallic strips 40 in the form of a cross on the surface of the pellicle 50 by using a cross-type template somewhat similar to that described above in the sandblasting step. Although a number of metals such as germanium, gold, aluminum, silver, tellurium, bismuth, chromium, antimony and nickel may be used for the sensitive elements, nickel was used in the particular embodiment by evaporating a layer of the nickel directly onto the pellicle 50 principally because nickel could be operated more quietly at smaller thicknesses than the other metals. The template was so positioned that the sensitive metal element 40 was deposited on the pellicle directly over the sandblasted cross 21 cut in glass surface 20. Since the dimensions of the sensitive elements are 9.5 mm. in length for a double arm of the cross and 1 mm. wide, the sandblasted cross chosen is preferably approximately 9.5 mm. in length, a little over 1 mm. wide, and about 0.5 mm. deep. With this type of template, direct contact between the sensitive element and the supporting glass backing is reduced to the terminal cross ends.

Following the nickel evaporation, second contacts of copper were laid down, sandwiching the nickel strips between upper contact members 51, 52, 53, 54, 55 and lower contact members 31, 32, 33, 34 and 35, respectively. Particles of solder were deposited on each contact in order to penetrate the copper layer and pellicle and form a firm bond and electrical connection with the lower chromium-silver contacts, although in some cases such positive contact was not found to be necessary.

In order to render the bolometer more specific in its action and in order to limit its range of response to a desired portion of the infrared spectrum, sensitive cross elements 40, Fig. 3, were blackened by evaporating thereover a thin layer of bismuth, using a cross bearing template extending over the entire width of the groove. This results in a highly effective heat-absorbing medium in direct contact with the sensitive elements forming cross 40. Various other metals may be used for this black layer, such as bismuth, antimony, aluminum and gold, or mixtures thereof. However, it was found that bismuth worked much more easily and hence is preferred.

The final step in assembling the bolometer of Fig. 3 comprises soldering the bolometer housing comprising deep drawn silver ring 60 in which silver chloride window 61 is vacuum-sealed as by silver soldering therein. Various materials other than silver chloride, such as rock salt, Pliofilm and polyethylene may also be used for the window 61, but silver chloride and rock salt are preferred since they have the highest transmission ratio for the particular part of the electromagnetic spectrum covered by the range 7 through 14μ. Since silver chloride deteriorates rapidly upon overexposure to visible light, it was found necessary to protect the window 61 by an external coating of materials opaque to the visible and ultraviolet. Such a layer is obtained by coating the silver chloride window with a thin layer of stibnite either by evaporation or by direct application, followed by an external protective layer of plastic material having a refractive index of 1.59.

After evacuating the air from the interior of the bolometer through hollow lead 11 and sealing the latter off, the bolometer is ready for insertion in the circuit for which it is to be used.

It is to be understood that the pellicle 50 may be of various thicknesses from approximately 1000 Angstrom units to 3000 Angstrom units. The thinner layers result in less heat abstraction from the sensitive metal elements. Briefly, the backing film should be of such thickness as to: (a) stand the impact of the metal particles during evaporation; (b) stand the heat developed during the evaporation process; (c) support the bolometer strip when subjected to mechanical shock.

Moreover, any of the various other metals disclosed above may be used instead of nickel as the sensitive element. However, nickel has been found to be highly satisfactory and its relatively high thermal coefficient at high temperatures, its electrical stability in operation and its time constant, as well as its quietness in operation, all render it a highly desirable material for use as the sensitive element.

In one preferred embodiment, the bolometer comprises a sensitive metal element of nickel 200 Angstrom units thick evaporated on a nitrocellulose pellicle approximately 1000 Angstrom units thick. The pellicle was supported on a glass base in which a groove was sand-blasted. This groove was immediately below and slightly wider than the sensitive metal strip. Such a typical bolometer had a signal-to-noise ratio of six with one-tenth microwatts peak to peak energy when used with an amplifier capable of passing a 100-cycle per second signal modulated at thirty cycles per second. It furthermore had a time constant of five milliseconds.

Since certain changes may be made in the above devices, and different embodiments of the invention could be made without departing from the scope thereof, it is intended that all matter contained in the above description and shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A bolometer for detecting heat rays comprising an insulating base, terminals imbedded in the base, the insulating base providing a groove, a pellicle supported by said insulating base and having a free area extending over said groove, a heat-sensitive element supported by the pellicle, the portion of the pellicle supporting the heat-sensitive element being free from direct contact with the insulating base at the edges of said groove, means for connecting the sensitive element to the terminals, a cover for the base making an air-tight seal therewith, a heat-transmitting window in said cover, and means in the base for evacuating the interior of the bolometer whereby its sensitivity is increased.

2. In a bolometer for measuring heat radiation, insulating mounting means providing a groove, a pellicle supported by said insulating means and having a free area extending over said groove, and a heat-sensitive element supported by the pellicle and extending over said free area whereby the heat-sensitive element is rendered relatively free from heat conduction losses.

3. In a bolometer for measuring heat radiation, insulating mounting means providing a groove, a pellicle supported by said insulating means and having a free area extending over said groove, a heat-sensitive element supported by the pellicle and extending over said free area, the portion of the pellicle supporting the heat-sensitive element being free from direct support by the insulating mounting means, whereby the heat-sensitive element is rendered relatively free from heat conduction losses.

4. In a bolometer for measuring heat radiation, insulating means providing a cross-shaped groove, terminals imbedded in the insulating means, lower metallic contacts evaporated on the insulating means joining predetermined portions of the cross-shaped groove with individually distinct terminals, a pellicle supported by said insulating means and having a free area extending over said groove, a heat-sensitive element supported by the pellicle and extending over said free area, upper contacts evaporated on the pellicle and superimposed to register directly with said lower contacts, a drop of solder on each superimposed contact to establish direct connection between respectively superposed upper and lower contacts, and a black heat-absorbing layer superposed upon the heat-sensitive element.

5. In a bolometer for measuring heat radiation, insulating means providing a cross-shaped groove, terminals imbedded in the insulating means, lower metallic contacts evaporated on the insulating means joining predetermined portions of the cross-shaped groove with individually distinct terminals, a pellicle supported by said insulating means and having a free area extending over said groove, a heat-sensitive element comprising an evaporated nickel layer supported by the pellicle and extending approximately over said free area, upper contacts evaporated on the pellicle and superimposed to register directly with said lower contacts, a drop of solder on each superimposed contact to establish direct connection between respectively superposed upper and lower contacts, and a black heat-absorbing layer of bismuth superposed upon the heat-sensitive element.

BRUCE H. BILLINGS.
WALTER L. HYDE.
EDGAR E. BARR.